US009741336B2

(12) United States Patent
Williams

(10) Patent No.: US 9,741,336 B2
(45) Date of Patent: *Aug. 22, 2017

(54) SYSTEM AND METHOD FOR GENERATING MANUALLY DESIGNED AND AUTOMATICALLY OPTIMIZED SPOKEN DIALOG SYSTEMS

(71) Applicant: Nuance Communications, Inc., Burlington, MA (US)

(72) Inventor: Jason D. Williams, Seattle, WA (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/185,304

(22) Filed: Jun. 17, 2016

(65) Prior Publication Data

US 2016/0293158 A1 Oct. 6, 2016

Related U.S. Application Data

(63) Continuation of application No. 14/617,172, filed on Feb. 9, 2015, now Pat. No. 9,373,323, which is a
(Continued)

(51) Int. Cl.
*G10L 15/06* (2013.01)
*G10L 15/22* (2006.01)
(Continued)

(52) U.S. Cl.
CPC ........ *G10L 15/063* (2013.01); *G06F 17/2881* (2013.01)

(58) Field of Classification Search
CPC ........ G10L 15/22; G10L 15/063; G10L 15/01; G06F 17/279; G06F 17/30976
See application file for complete search history.

(56) References Cited

U.S. PATENT DOCUMENTS 6,336,108 B1  1/2002  Thiesson et al.
6,862,497 B2  3/2005  Kemp et al.
(Continued)

OTHER PUBLICATIONS

Hoey, Jesse, et al. "Automated handwashing assistance for persons with dementia using video and a partially observable markov decision process." Computer Vision and Image Understanding 114.5 (2010): 503-519.*
(Continued)

*Primary Examiner* — Matthew Baker

(57) ABSTRACT

Disclosed herein are systems, computer-implemented methods, and tangible computer-readable storage media for generating a natural language spoken dialog system. The method includes nominating a set of allowed dialog actions and a set of contextual features at each turn in a dialog, and selecting an optimal action from the set of nominated allowed dialog actions using a machine learning algorithm. The method includes generating a response based on the selected optimal action at each turn in the dialog. The set of manually nominated allowed dialog actions can incorporate a set of business rules. Prompt wordings in the generated natural language spoken dialog system can be tailored to a current context while following the set of business rules. A compression label can represent at least one of the manually nominated allowed dialog actions.

18 Claims, 4 Drawing Sheets

Related U.S. Application Data continuation of application No. 14/338,550, filed on Jul. 23, 2014, now Pat. No. 8,954,319, which is a continuation of application No. 12/501,925, filed on Jul. 13, 2009, now Pat. No. 8,793,119.

(51) Int. Cl.
*G10L 15/28* (2013.01)
*G06F 17/28* (2006.01)

(56) References Cited

U.S. PATENT DOCUMENTS

| | | | |
|---|---|---|---|
| 7,707,131 | B2 | 4/2010 | Chickering et al. |
| 7,720,684 | B2 | 5/2010 | Huerta et al. |
| 7,734,471 | B2 | 6/2010 | Paek et al. |
| 7,882,047 | B2 | 2/2011 | DiProfio |
| 8,010,364 | B2 | 8/2011 | Williams |
| 8,046,227 | B2 | 10/2011 | Starkie |
| 8,140,328 | B2 | 3/2012 | Williams |
| 8,204,738 | B2 | 6/2012 | Skuratovsky |
| 8,260,617 | B2 | 9/2012 | Dhanakshirur et al. |
| 8,285,550 | B2 | 10/2012 | Wu et al. |
| 2006/0206332 | A1 | 9/2006 | Paek et al. |
| 2006/0206337 | A1 | 9/2006 | Paek et al. |
| 2007/0206017 | A1 | 9/2007 | Johnson et al. |
| 2007/0213984 | A1 | 9/2007 | Ativanichayaphong et al. |
| 2007/0233497 | A1 | 10/2007 | Paek et al. |
| 2008/0181099 | A1 | 7/2008 | Torab et al. |
| 2009/0112586 | A1 | 4/2009 | Williams |
| 2010/0063823 | A1 | 3/2010 | Wu et al. |

OTHER PUBLICATIONS

Williams, Jason D., Pascal Poupart, and Steve Young. "Factored partially observable Markov decision processes for dialogue management." Proc. IJCAI Workshop on Knowledge and Reasoning in Practical Dialogue Systems. 2005.*

Young, Steve, et al. "The hidden information state approach to dialog management." 2007 IEEE International Conference on Acoustics, Speech and Signal Processing—ICASSP'07. vol. 4. IEEE, 2007.*

Pineau, Joelle, and Sebastian Thrun. "Hierarchical POMDP decomposition for a conversational robot." ICML Workshop on Hierarchy and Memory in Reinforcement Learning. 2001.*

S. Young et al., "The Hidden Information State Approach to Dialog Management," Acoustics, Speech and Signal Processing, 2007, ICASSP 2007, IEEE International Conference, vol. 4, pp. IV-149-IV-152, Apr. 15-20, 2007.

S. Singh et al., "Optimizing dialogue management with reinforcement learning: experiments with the NJFun System," J. Artif. Int. Res., 16, Feb. 1, 2002, pp. 105-133.

M. Nakano et al., "A two-layer model for behavior and dialogue planning in conversational service robots," Intelligent Robots and Systems, 2005, IROS 2005, 2005 IEEE?RSJ International Conference, pp. 3329-3335, Aug. 2-6, 2005.

T.H. Bui et al., "A tractable DDN-POMDP Approach to Affective Dialogue Modeling for General Probabilistic Frame-based Dialogue Systems," Technical Report TR-CTIT-06-65, Centre for Telematics and Information Technology University of Twente, Enschede, ISSN 1381-3625.

J.D. Williams et al., "Scaling Up POMDPs for Dialog Management: The 'Summary POMDP' Method", Automatic Speech Recognition and Understanding, 2005 IEEE Workshop, pp. 177-182, Nov. 27, 2005.

J. Williams et al., "Partially Observable Markov Decision Processes for Spoken Dialog Systems", Computer Speech and Language, 21, 2007, 393-422.

J. Schatzmann et al., "Agenda-Based User Simulation for Bootstrapping a POMDP Dialogue System," In Human Language Technologies 2007: The Conference of the North American Chapter of the Association for Computational Linguistics; Companion Volume, Short Papers (NACCL—Short '07).

B. Thomson et al., "Training a Real-World POMDP-based Dialogue System," In Proceedings of the Workshop on Bridging the Gap. Academic and Industrial Research in Dialog Technologies (NAACL-HLT—Dialog '07) Association for Computational Linguistics, Stroudsburg, PA, USA, 9-16.

M. Gasic et al., "Training and Evaluation of the HIS-POMDP Dialogue System in Noise," in Proc. $9^{th}$ SIGdial, Columbus, Ohio, Jun. 19-20, 2008.

S. Keizer et al., "Modeling User Behaviour in the HIS-POMDP Dialogue Manager," Spoken Language Technology Workshop, 2008, SLT 2008, IEEE, pp. 121-124, Dec. 15-19, 2008, doi:10. 1109/SLT.2008.4777855.

Ji, Gang, and Jeff Bilmes, "Backoff model training using partially observed data: Application to dialog act tagging," Proceedings of the main conference on Human Language Technology Conference of the North American Chapter of the Association of Computational Linguistics, Association for Computational Linguistics, 2006.

William, Jason D., "The best of both worlds: unifying conventional dialog systems and POMDPs", In INTERSPEECH, 2008, 1173-1176.

* cited by examiner

FIG. 5

| 502 Belief state b(s) | 504 Traditional State n | 506 State Features $\hat{x}$ | 508 Allowed Actions $(\hat{a},a)$ | 510 $Q(\hat{x},\hat{a})$ | 512 Transcript |
|---|---|---|---|---|---|
| James A. Wilson<br>James B. Wilson<br>Jason Williams<br>Jay Wilpon<br>... | topCallee: [null]<br>confirmed: [null]<br>matches: [null] | p(topCallee): □<br>confirmed: no<br>ambiguous: no | "First and last name?"<br>AskName | -- | S1: First and last name?<br>U1: Jason Williams<br>JAMES WILSON~0.5<br>JASON WILLIAMS~0.4 |
| James A. Wilson<br>James B. Wilson<br>Jason Williams<br>Jay Wilpon<br>... | topCallee: James A. Wilson<br>confirmed: no<br>matches: 2 | p(topCallee): □<br>confirmed: no<br>ambiguous: yes | "Sorry, name please?"<br>AskName | 15 | S2: Sorry, name please?<br>U2: Jason Williams<br>JAY WILPON~0.6<br>JASON WILLIAMS~0.5 |
|  |  |  | "James A. Wilson, Dallas, Texas"<br>ConfirmName | 12 |  |
|  |  |  | "City and state?"<br>AskLocation | 10 |  |
| James A. Wilson<br>James B. Wilson<br>Jason Williams<br>Jay Wilpon<br>... | topCallee: Jason Williams<br>confirmed: no<br>matches: 2 | p(topCallee): □<br>confirmed: no<br>ambiguous: no | "Sorry, name please?"<br>AskName | 16 | S3: Jason Williams<br>U3: [silent]<br>[NOINPUT] |
|  |  |  | "Jason Williams."<br>ConfirmName | 17 |  |
| James A. Wilson<br>James B. Wilson<br>Jason Williams<br>Jay Wilpon<br>... | topCallee: Jason Williams<br>confirmed: no<br>matches: 2 | p(topCallee): □<br>confirmed: yes<br>ambiguous: no | "I'm sorry, name please?"<br>AskName | 17 | S4: Dialing |
|  |  |  | "Call Jason Williams?"<br>ConfirmName | 18 |  |
|  |  |  | "Dialing."<br>TransferCall | 19 |  |

SYSTEM AND METHOD FOR GENERATING MANUALLY DESIGNED AND AUTOMATICALLY OPTIMIZED SPOKEN DIALOG SYSTEMS

PRIORITY

The present application is a continuation of U.S. patent application Ser. No. 14/617,172, filed Feb. 9, 2015, which is a continuation of U.S. patent application Ser. No. 14/338,550, filed Jul. 23, 2014, now U.S. Pat. No. 8,954,319, issued Feb. 10, 2015, which is a continuation of U.S. patent application Ser. No. 12/501,925, filed Jul. 13, 2009, now U.S. Pat. No. 8,793,119, issued Jul. 29, 2014, the contents of which are incorporated herein by reference in their entirety.

BACKGROUND

1. Technical Field

The present disclosure relates to spoken dialog systems and more specifically to combining manual design of spoken dialog systems with an automatic learning approach.

2. Introduction

The development of interactive computer systems is expensive and time-consuming. Further, the user interface to such systems poses a significant challenge. Despite years of research, speech recognition technology is far from perfect, and speech recognition errors remain a central problem for the user interface. Misunderstanding the user's speech causes the system to get off track and often leads to failed dialogs.

Two approaches are commonly used for generating spoken dialog systems, the conventional approach and the automatic learning approach. The conventional or manual design approach is often used in commercial or industrial settings. Such commercial systems have a manually designed computer program controlling the flow of the conversation. A dialog designer can tailor all the prompts to say exactly what she wants. Because a computer program controls the dialog flow, a designer can modify the computer program to encode business rules. Some examples of business rules include always confirm money transfer with a yes/no question and never display account info unless the corresponding user account is verified. A dialog designer must generate detailed flow charts outlining the possible branches in the conversation. These flow charts can be incredibly large and complicated (i.e. hundreds of Microsoft Visio pages) because conversations are temporal. At every point, the person can say something different, so the tree is complicated with lots of branches and loops. A designer typically ignores a lot of state information, history, and dialog details to simplify these complicated trees. As such, manually designed systems are not very robust to speech recognition errors.

The automatic learning approach uses machine learning and optimization to design the dialog system. Instead of specifying when the system should take a certain action as in the conventional approach set forth above, the system selects an action from a palette of possible actions. For example, in an airline dialog system, the system can say "Where do you want to fly from?", "Where do you want to fly to?", "OK, you want to fly to Phoenix.", confirm the date or flight class, print a ticket, etc. The optimization procedure is unconstrained regarding the order or dependencies between variables and may take any action at any time. The automatic learning approach interacts with a user simulation and employs reinforcement learning to try out all the different sequences of actions in order to come up with a dialog plan. This approach still requires a lot of work, but the dialog plan is more robust and detailed. The dialog system is not bounded by what the designer can hold in her head or express in numerous Visio pages. The dialog becomes an optimization problem that a computer can solve with as much detail as desired.

However, both of these approaches have shortcomings. Automatic learning does not provide a good way to express business rules in this context because the system can take any of the actions at any time. The automatic learning approach also encounters difficulty knowing how to tailor prompts appropriately. For example, the system knows that there is a certain way of asking "where are you flying to", or on what date, but has a hard time knowing how and when to say things like, "Oh, sorry. Where do you want to fly from?" Those joining words and phrases and intonations designed to elicit just the right response from users are difficult to generate in this approach because the system just knows the general form of the question but not how to tailor that question to different situations. Accordingly, what is needed in the art is an improved way to blend the strengths of the conventional and automatic learning approaches while minimizing their shortcomings.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, computer-implemented methods, and tangible computer-readable storage media for generating a natural language spoken dialog system. The method includes nominating a set of allowed dialog actions and a set of contextual features at each turn in a dialog, and selecting an optimal action from the set of nominated allowed dialog actions using a machine learning algorithm. The method also includes generating a response based on the selected optimal action at each turn in the dialog or generating a spoken dialog system based on the process of selecting optimal actions at each dialog turn. The set of manually nominated allowed dialog actions can incorporate a set of business rules. Prompt wordings in the generated natural language spoken dialog system can be tailored to a current context while following the set of business rules. To facilitate optimization by the machine learning algorithm, a compression label can represent at least one of the manually nominated allowed dialog actions.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 5 illustrates an example conversation and operation of the method in detail.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
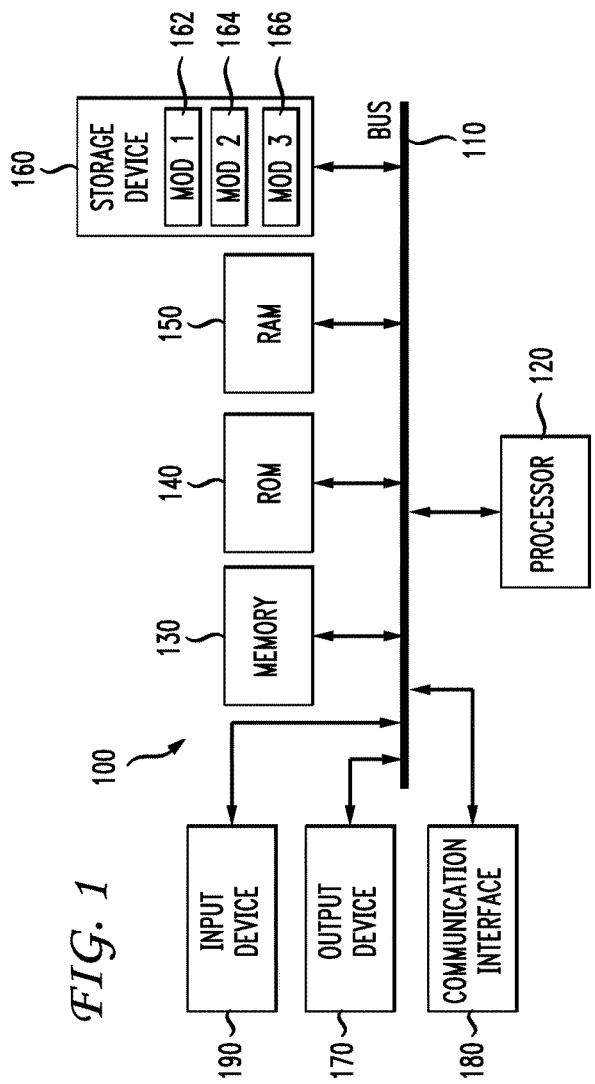
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. These and other modules can be configured to control the processor 120 to perform various actions. Other system memory 130 may be available for use as well. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a tangible and/or intangible computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. The input device 190 may be used by the presenter to indicate the beginning of a speech search query. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Generally speaking, such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Having disclosed some basic system components, the disclosure now turns to background material relevant for understanding the method. First the disclosure describes how dialog systems operate in general.

At each turn in a dialog, the dialog system takes a speech action A, such as "Where are you leaving from?" A user then responds with action U, such as "Boston". The speech recognition engine processes this U to produce an observation O, such as "AUSTIN". The dialog system examines O, updates its internal state, and outputs another A. There are common approaches used for generating spoken dialog systems: the conventional approach and the automatic learning approach. The conventional and automatic approaches differ in how they maintain internal state, and how they choose actions given the state.

A conventional dialog manager maintains a state N such as a form or frame and relies on two functions for control, G and F. For a given dialog state N, G(N)=A decides which system action to output, and then after observation O has been received, F(N, O)=N' decides how to update the dialog state N to yield N'. This process repeats until the dialog is over. G and F are written by hand, for example in a language such as VoiceXML.

Next is described how an automatic approach operates. For clarity of exposition, one automatic approach in particular is chosen, called a partially observable Markov decision process (POMDP), to use in this description. However those skilled in the art will recognize that other automatic approaches could be used in place of a POMDP.

Unlike the conventional approach, a POMDP tracks a probability distribution over many dialog states. In the POMDP, there are a set of hidden states, where each hidden state s represents a possible state of the conversation, including quantities such as the user's action U, the user's underlying goals, and the dialog history. Because the true state of the conversation isn't known, the POMDP maintains a belief state (probability distribution) over these hidden states, B, where B(S) is the belief (probability) that S is the true state. By adding models of how the hidden state changes and how the observation is corrupted, it is straightforward to update this distribution—i.e., B'(S')=P(S'|A, O, B). The system 100 can employ various methods for doing this efficiently and/or approximately. The belief state has the desirable property of accumulating information across all of the actions and observations over the course of the entire dialog history, and provides robustness to speech recognition errors.

In principle, a developer could write a function to choose actions G(B)=A, but in practice it is extremely difficult for a person to see how to make use of all of the information in the belief state, especially with even a moderately complex dialog. Instead, reinforcement learning is applied, in which a developer specifies high-level goals in the form of a reward function, R(S, A). R assigns a measure of goodness to each state/action pair and communicates, for example, the relative values of short dialogs and successful task completion. An optimization procedure then searches for the best action to take in each belief state in order to maximize the sum of rewards over the whole dialog. The result is a value function Q(B, A), which estimates the long-term reward of taking action a at belief state B. The optimal action in belief state B is then $A^* = \text{argmax}_A Q(B, A)$.

In practice, the domain of Q(B, A) is too large and compression is applied. One method is the so-called "summary" method. The intuition is to map B and A into lower-dimensional feature vectors $\hat{B}$ and $\hat{A}$, and to estimate a value function $\hat{Q}$ ($\hat{B}$, $\hat{A}$) in this compressed space. For example, $\hat{B}$ can reduce a distribution over all cities into the probability of only the most likely city, and $\hat{A}$ can compress the class of confirm actions (confirm(london), confirm(boston)) into a single confirm(most-likely-city).

The method described herein unifies these two approaches by making several changes. The method extends the conventional dialog manager in at least one of three respects. First, its action selection function G(N)=A is changed to output a set of one or more (M) allowable actions given a dialog state N, each with a corresponding summary action, $G(N) = \{(A_{(1)}, \hat{A}_{(1)}), \ldots, (A_{(M)}, \hat{A}_{(M)})\}$. Next, its transition function F(N, O)=N' is extended to allow for different transitions depending on which of these action was taken, and it is also given access to the resulting POMDP belief state, F(N, A, O, B')=N'. A human dialog designer still designs the contents of the state N and writes the functions G and F.

For action selection, the system 100 can apply compression but the state features used for action selection will be a function of both the belief state B and the dialog state N. This state feature vector is written $\hat{X}$ and is computed by a feature-function H(B, N)=$\hat{X}$. The POMDP value function is correspondingly re-cast to assign values to these feature vectors, $\hat{Q}$ ($\hat{X}$, $\hat{A}$).

The unified dialog manager operates as follows. At each time-step, the dialog manager is in state N and the POMDP is in belief state B. The dialog manager nominates a set of M allowable actions, where each action A(M) includes its summarized counterpart $\hat{A}$ (M). The state features are computed as $\hat{X}$=H(B, N). Then, the POMDP value function $\hat{Q}$ ($\hat{X}$, $\hat{A}$) is evaluated for only those actions nominated by the dialog manager (not all actions), and the index M* of the action that maximizes the POMDP value function is returned:

$$M^* = \arg \max_{M \in [1, M]} \hat{Q}(\hat{X}, \hat{A}_M) \quad \text{(Equation 1)}$$

The system 100 outputs action $A_{M^*}$ and receives reward R and observation O. The POMDP updates its belief state B'(S')=P(S'|$A_{M^*}$, O, B) and the dialog manager transitions to dialog state N'=F(N, $A_{M^*}$, O, B'). An example of this process taken from the real system described below is shown in FIG. 5.

In this method, action selection can be viewed as a general reinforcement learning problem, where states are feature vectors $\hat{X}$. This enables any general-purpose reinforcement learning technique to be applied, such as value function approximation, in either an off-line or on-line setting. The only requirement is that the learning technique produces an estimate of $\hat{Q}$ ($\hat{X}$, $\hat{A}$). Moreover, intuitively, the effect of constraining which actions are available prunes the space of policies, so if the constraints are well-informed, then optimization ought to converge to the optimal policy faster.

Figure 2:
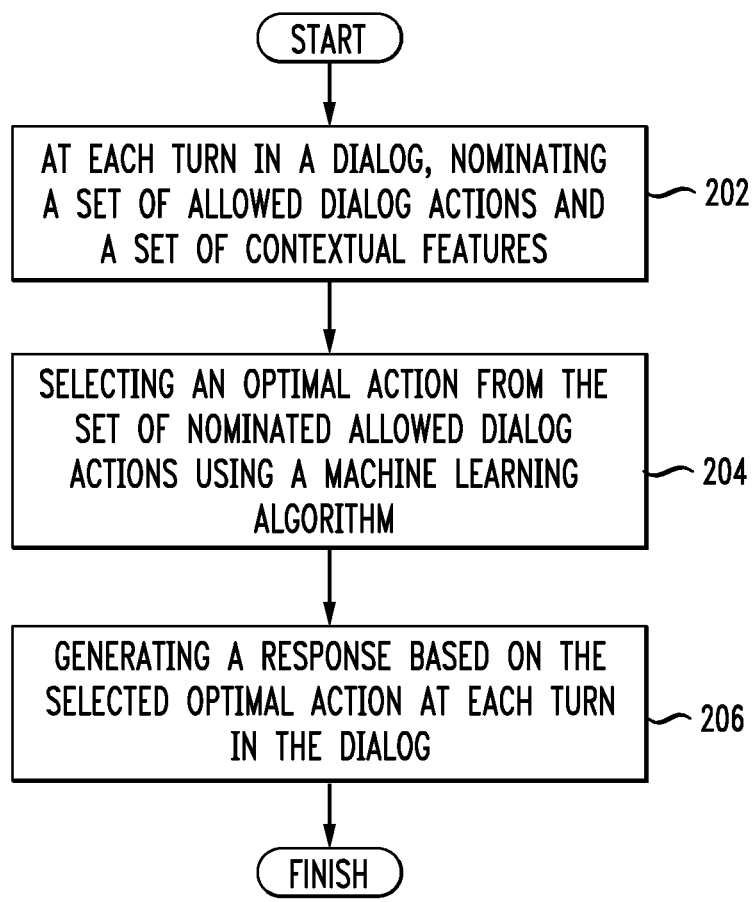
FIG. 2 illustrates an example method embodiment.

One example of the method embodiment is shown in FIG. 2. This generally refers to a method for generating a natural language spoken dialogue system or a component of such a system. The system 100 receives a set of manually nominated set of allowed dialog actions and a set of contextual features at each turn in a dialogue (202). Next, the method includes selection of an optimal action from the set of nominated allowed dialog actions using a machine learning algorithm (204). In one aspect, the method also includes generating a response based on the selected optimal action at each turn in the dialog. (206). In another aspect, this last step involves generating a spoken dialog system based on the process of optimal actions at each dialog turn.

This method has been tested on an existing voice dialer application within the AT&T research lab which receives daily calls. The dialer's vocabulary consists of 50,000 AT&T employees. Since many employees have the same name, the dialer can disambiguate by asking for the called party's location. The dialer can also disambiguate between multiple phone listings for the same person (office and mobile) and can indicate when a called party has no number listed. This dialog manager tracks a variety of elements in its state N, including the most recently recognized called party, how many called parties share that name, whether the called party has been confirmed, and many others. This existing dialer was used as our baseline, labeled as HC 306 in FIG. 3.

The experiment then created the POMDP. The belief state followed a model known as the SDS-POMDP model, and maintained a belief state over all called parties. The user model and speech recognition models used to update the belief state were based on based on transcribed logs from 320 calls.

The experiment extended the existing dialer in at least two respects. First, rather than tracking the most recently recognized called parties or callees, it instead obtained the most likely callee from the POMDP belief state. Second, it was altered to nominate a set of one or more allowable actions using knowledge about this domain. For example, on the first turn of the dialog, the only allowed action was to ask for the callee's name. Once a callee has been recognized, the system can query the callee or confirm received information. Additional actions are allowed depending on the properties of the most likely callee. For example, if the top callee is ambiguous, then asking for the callee's city and state is allowed. If the top callee has both a cellphone and office phone listed, then asking for the type of phone is allowed. The transfer action is permitted only after the system has attempted confirmation. This unified controller was called "HC+POMDP" 408 in FIG. 4.

Because the actions were nominated by the hand-crafted dialog manager, tailoring the prompt wordings to the dialog context was straightforward. For example, the first request for the callee's name was "First and last name", whereas the second was "Sorry, name please?" These both appeared to the planning algorithm as the summary action $\hat{A}$=AskName. Also, when a callee's name is ambiguous, it ought to be confirmed with the callee's location or, in other settings, with some other piece of unique information.

For comparison, another controller was created which nominated every action at every time-step. Its actions also acted on the most likely callee in the belief state but no other restrictions were imposed. It could, for example, transfer a call to a callee who has not been confirmed, or ask for the city and state even if the top callee was not ambiguous. This controller was called "POMDP" 406 in FIG. 4.

For optimization, the state features include at least two continuous features and several discrete features. The continuous features are taken from the belief state and are the probability that the top callee is correct, and the probability that the top callee's type of phone (office or cell) is correct. The discrete features are how many phone types the top callee has (none, one, two), whether the top callee is ambiguous (yes, no), and whether confirmation has yet been requested for the top callee (yes, no).

Finally, a simple reward function was created which assigns −1 per system action plus +/−20 for correctly/incorrectly transferring the caller at the end of the call.

Optimization was performed on "POMDP" 406 and "HC+POMDP" 408 using dialog simulation with the user and ASR models estimated from the 320 transcribed calls. The optimization method roughly follows summary point-based value iteration. Space limitations preclude a complete description. K synthetic dialogs were generated by randomly choosing allowed actions. The space of state features was quantized into small regions, and a transition and reward function over these regions were estimated by frequency counting, applying some smoothing to mitigate data sparsity. The system 100 then applied straightforward value iteration to the estimated transition and reward functions to produce a value function $\hat{Q}(\hat{X}, \hat{A})$. The optimization procedure, simulation environment, state features, and action set were identical for "POMDP" 406 and "HC+POMDP" 408. The only difference was whether the set of allowed actions was constrained or not.

Using the system described above, optimization was conducted for various numbers of K dialogs for "POMDP" 308 and "HC+POMDP" 310, ranging from K=10 to K=10, 000. After optimization, each policy was evaluated in simulation for 1000 dialogs to find the average return, average task completion rate, and average dialog length. The simulation environment for optimization and evaluation were identical. For each value of K, this whole process (optimization and evaluation) was run 10 times, and the results of the 10 runs were averaged. 1000 simulated dialogs were also run with the baseline "HC" 306, using the same simulation environment.

Figure 3:
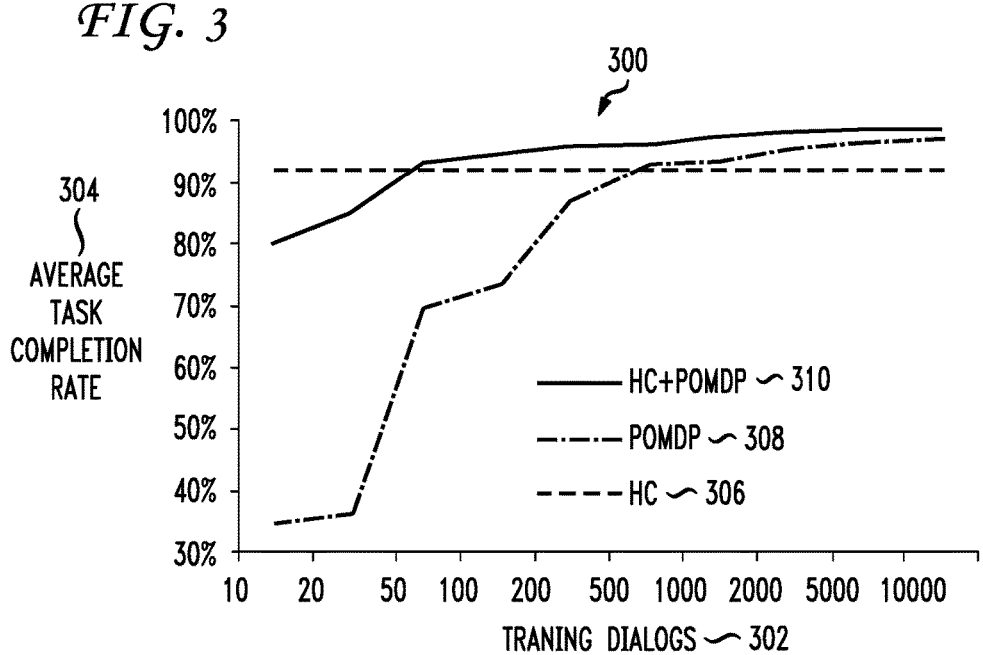
FIG. 3 illustrates sample task completion rates.
Figure 4:
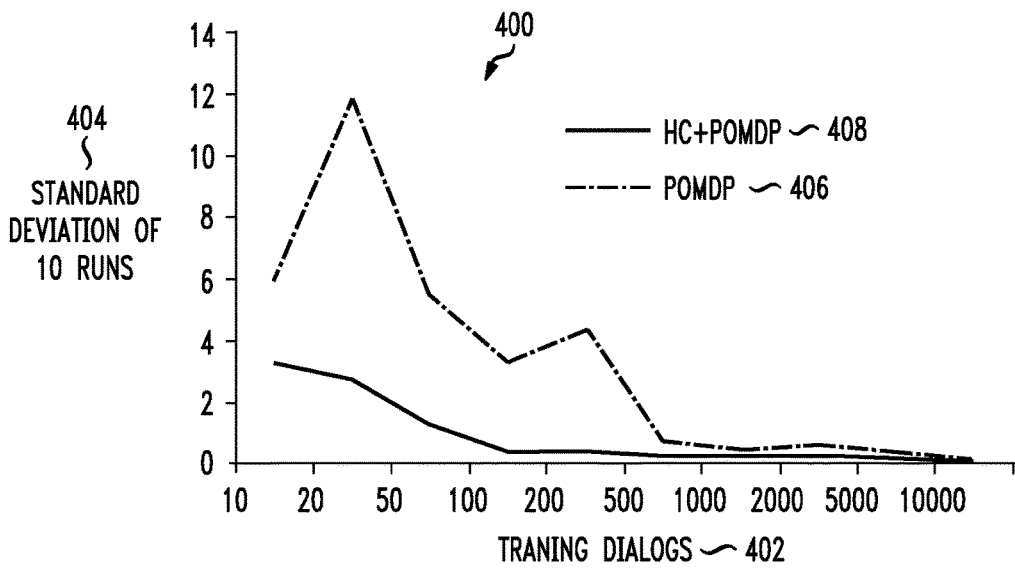
FIG. 4 illustrates a standard deviation of the average total reward per dialog.

Results 300 for task completion rate are shown in FIG. 3. As the number of training dialogs 302 increases, performance of both POMDP 308 and HC+POMDP 310 increase to roughly the same asymptote. With sufficient training dialogs, both POMDP 308 and HC+POMDP 310 are able to out-perform the baseline on average task completion rate 304. However, HC+POMDP 310 reaches this asymptote with many fewer dialogs. Moreover, inspection of the 10 runs at each value of K showed that the HC+POMDP 310 policies were significantly more consistent. FIG. 4 shows that the standard deviation of the average total reward per dialog over the 10 runs is lower for HC+POMDP 408 than for POMDP 406.

These results verify that incorporating a POMDP into a conventional dialog system in accordance with the principles disclosed herein increases performance. Moreover, when compared to a pure POMDP, this method reduces training time and yields more consistent results vs. a pure POMDP. In other words, not only does this approach combine the strengths of the two methods, it can also reduce optimization time and produce spurious policies less often.

One of the policies created using with this method trained on 10,000 simulated dialogs was experimentally installed in our internal phone system. It uses up to 100 ASR N-best entries and maintains a dialog beam of up to 100 callers. Its response time of 2-3 seconds is essentially identical to the baseline system. FIG. 5 shows an example conversation illustrating operation of the method in detail.

FIG. 5 illustrates an example conversation and operation 500 of the HC+POMDP dialog manager in detail. The first column 502 shows the POMDP belief state B(S), which is a distribution over all possible callees. The second column 504 shows the conventional dialog state N, which includes the name of the most likely callee in the belief state, whether the top caller has been confirmed, and how many other callees share the top callee's name. The third column 506 shows some of the state features in $\hat{X}$, including the belief in the top callee (extracted from B) and whether the callee's name is ambiguous or confirmed (extracted from N). The fourth column 508 shows the actions A (and summary actions Â below) nominated by the conventional dialog manager. Because the conventional dialog manager has been designed by hand, the system can tailor the prompts to the dialog context—for example, confirming an ambiguous callee includes their location. The fifth column 510 shows the value estimated by the optimization for each summary action given the current state features $\hat{Q}$ ($\hat{X}$, Â), and a box indicates the maximum $\hat{Q}$ value, which is output in the sixth column 512, showing the dialog transcript. The entries in upper-case letters show the results from the recognition process with confidence scores. Note that after the second system turn, "Jason Williams" has appeared on the N-Best list twice, and as a result in the beginning of the third system turn it has acquired the most mass in the belief state.

The disclosure herein presents a novel method to unify conventional dialog design practices in industry with the emerging approach in research based on partially observable Markov decision processes (POMDPs). The POMDP belief state and the conventional dialog state run in parallel, and the conventional dialog manager is augmented so that it nominates a set of one or more acceptable actions. The POMDP then chooses an action from this limited set. The method naturally accommodates compression akin to the "summary" method, and this enables the method to scale to non-trivial domains—here a voice dialer application covering 50,000 listings. Simulation experiments drawing on usage data from a real dialog system demonstrated that the method outperformed our existing baseline dialer, while simultaneously requiring less training data than a classical POMDP. This method can place POMDPs in a better position for use in commercial applications.

This disclosure teaches a method of building dialog systems by unifying conventional practices and POMDPs to gain the benefits of both: the fine-grain control of the conventional approach, and the robustness to errors of the POMDP. In one aspect, the conventional and POMDP systems run in parallel with several modifications. First, the conventional system, which usually outputs a single action, is modified to output a set of one or more allowed actions. These allowed actions are specified at a detailed level (as in a conventional system), tailored to the current dialog context. The idea is that each of the allowed actions is permissible in the current context according to business rules, conversational norms, or other criteria, but the optimal action isn't clear ahead of time to a developer or designer. For example, in a travel system, after an origin city has been recognized, the allowed actions might include re-asking the origin city or confirming it. Actions such as printing a ticket might not be allowed because no destination has been recognized yet, or because important terms and conditions haven't been read to the caller.

This set of allowed actions is then passed to the POMDP. The classical POMDP formulation is to consider every possible action, however unlikely or impossible. Instead, in this approach the POMDP chooses the best action within this restricted set of allowed actions. The POMDP does this by examining all of its hypotheses for the current dialog state as well as metadata describing the current dialog state and/or previous dialog turns, and using these to assign a score to each allowed action. This score is a measure of suitability for the action given the current set of hypotheses. The system returns the action with the highest score to the conventional dialog manager which plays it out to the user. This process then continues until the dialog terminates.

The POMDP scores are computed based on an optimization process, and in practice the number of possible state hypotheses and system outputs is too large to optimize directly. As a result, this approach also provides a method for performing optimization. First, along with each allowable action output by the conventional dialog manager, an "action pneumonic" is also output. This pneumonic is a compressed version of the action. For example, there are hundreds of actions like "From New York?", "From Boston?", and "From Salt Lake City?" which the system 100 can map to a single compressed pneumonic "ConfirmOrigin". In addition, the full list of dialog hypotheses is compressed to a set of state features. For example, the top hypothesis might be an itinerary from New York to Boston and have probability 0.6, and the state features might include the likelihood of the most likely itinerary (0.6) but drop the actual cities. Crucially, these state features may also include elements from the traditional dialog state, such as whether any flights are available from New York to Boston. The synthesis of the conventional and POMDP states into a set features for optimization allows the optimization to take into account business logic. The principles described herein can provide several benefits, including the creation of dialog systems which are more robust to speech recognition errors. In the context of telephone-based customer-care applications, this increased robustness can enable systems to achieve higher task completion rates. Moreover, because user satisfaction is highly correlated with how well they believes they are understood, these higher task completion rates are coupled with an increase in customer satisfaction. The addition of the POMDP reduces the chances of a user "getting stuck" by a speech recognition error, and they are more likely to accomplish their goal successfully. This approach can enable previously infeasible customer care applications for tasks such as troubleshooting or mobile phone configuration.

The principles disclosed herein can also have application in new contexts such as a speech-enabled electronic program guide (EPG) for television. The family room environment is likely to be noisy, and thus speech recognition errors will be common. The added robustness coupled with a full implementation of business policies and the expertise of dialog designers can be an important enabler in this space. Other applications of these principles include mobile device directory assistance, such as Yellow Pages searches, or multi-modal interactions on devices such as the iPhone in a variety of challenging out-of-home environments like cars, trains, and airports. Industries such as utilities, health care, airlines, and government would benefit from the principles disclosed herein.

Embodiments within the scope of the present disclosure may also include tangible computer-readable storage media for carrying or having computer-executable instructions or data structures stored thereon. Such computer-readable storage media can be any available media that can be accessed by a general purpose or special purpose computer, including the functional design of any special purpose processor as discussed above. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method comprising:
nominating, via a processor configured to use a partially observable Markov decision process in parallel with a conventional dialog state, a set of dialog actions and a set of contextual features; and
generating an audible response in a dialog between a user and a spoken dialog system based at least in part on the set of contextual features.

2. The method of claim 1, further comprising generating the audible response based on the set of dialog actions and via a machine learning algorithm.

3. The method of claim 2, further comprising augmenting the machine learning algorithm using reinforcement learning.

4. The method of claim 2, wherein the machine learning algorithm augmented by the reinforcement learning is based on the partially observable Markov decision process.

5. The method of claim 2, further comprising:
assigning a reward to the set of dialog actions as part of the machine learning algorithm.

6. The method of claim 1, further comprising tailoring wordings in the spoken dialog system associated with the dialog based on a current context and a set of business rules.

7. A system comprising:
a processor configured to perform speech recognition; and
a computer-readable storage medium having instructions stored which, when executed by the processor, cause the processor to perform operations comprising:
nominating, via a processor configured to use a partially observable Markov decision process in parallel with a conventional dialog state, a set of dialog actions and a set of contextual features; and
generating an audible response in a dialog between a user and a spoken dialog system based at least in part on the set of contextual features.

8. The system of claim 7, further comprising generating the audible response based on the set of dialog actions and via a machine learning algorithm.

9. The system of claim 8, further comprising augmenting the machine learning algorithm using reinforcement learning.

10. The system of claim 8, wherein the machine learning algorithm augmented by the reinforcement learning is based on the partially observable Markov decision process.

11. The system of claim 7, the computer-readable storage medium having additional instructions stored which, when executed by the processor, cause the processor to perform operations comprising:
assigning a reward to the set of dialog actions as part of the machine learning algorithm.

12. The system of claim 7, the computer-readable storage medium having additional instructions stored which, when executed by the processor, cause the processor to perform operations comprising tailoring wordings in the spoken dialog system associated with the dialog based on a current context and a set of business rules.

13. A computer-readable storage device having instructions stored which, when executed by a computing device configured to perform speech recognition, cause the computing device to perform operations comprising:
nominating a set of dialog actions and a set of contextual features, wherein the computing device uses a partially observable Markov decision process in parallel with a conventional dialog state; and
generating an audible response in a dialog between a user and a spoken dialog system based at least in part on the set of contextual features.

14. The computer-readable storage device of claim 13, further comprising generating the audible response based on the set of dialog actions and via a machine learning algorithm.

15. The computer-readable storage device of claim 14, further comprising augmenting the machine learning algorithm using reinforcement learning.

16. The computer-readable storage device of claim 14, wherein the machine learning algorithm augmented by the reinforcement learning is based on the partially observable Markov decision process.

17. The computer-readable storage device of claim 13, having additional instructions stored which, when executed by the computing device, cause the computing device to perform operations comprising:
assigning a reward to the set of dialog actions as part of the machine learning algorithm.

18. The computer-readable storage device of claim 13, having additional instructions stored which, when executed by the computing device, cause the computing device to perform operations comprising tailoring wordings in the spoken dialog system associated with the dialog based on a current context and a set of business rules.

* * * * *